Nov. 10, 1925.                                            1,560,950
W. F. THIELE
AIR TREATING APPARATUS FOR DRIERS
Filed Sept. 9, 1922          3 Sheets-Sheet 1
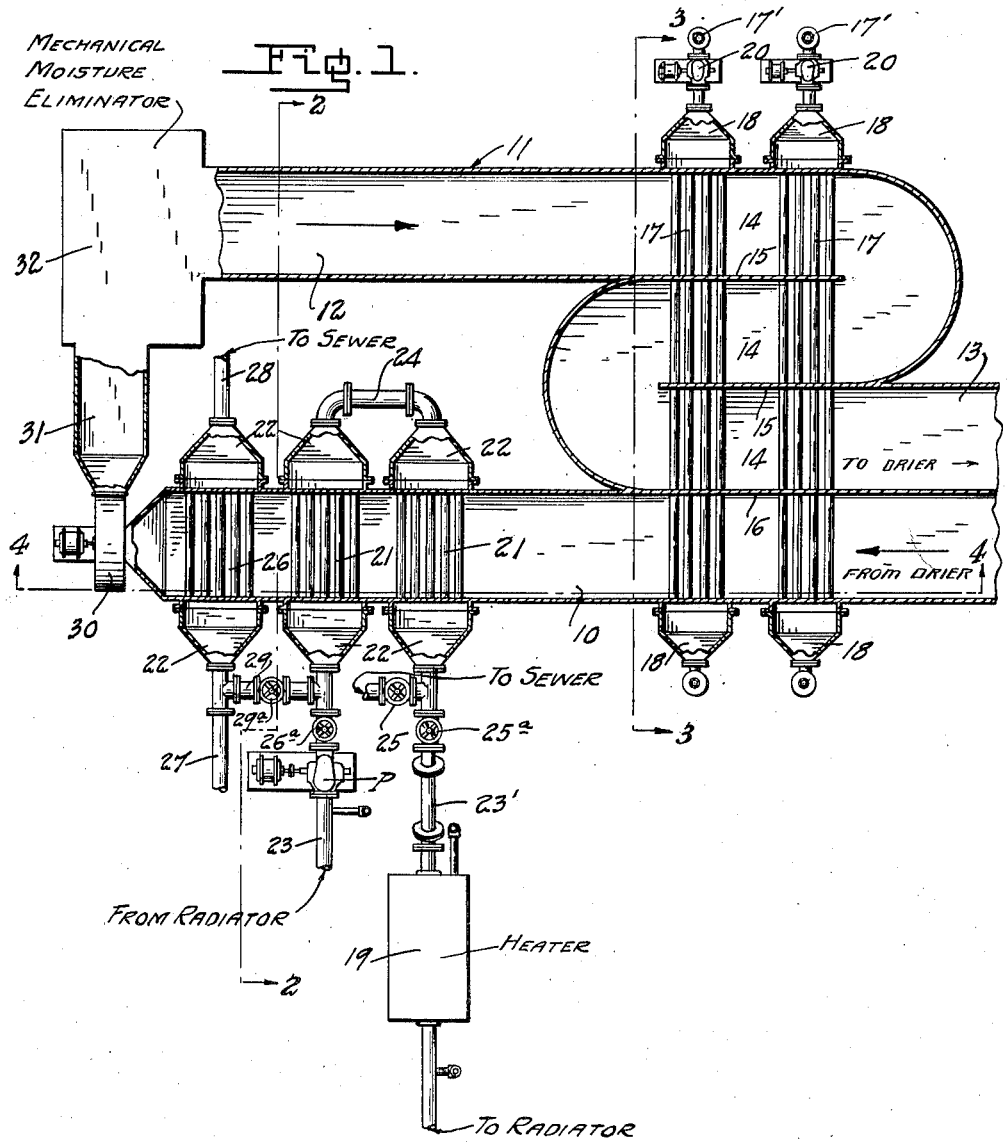
Inventor
William F. Thiele
By Watson E. Coleman
Attorney

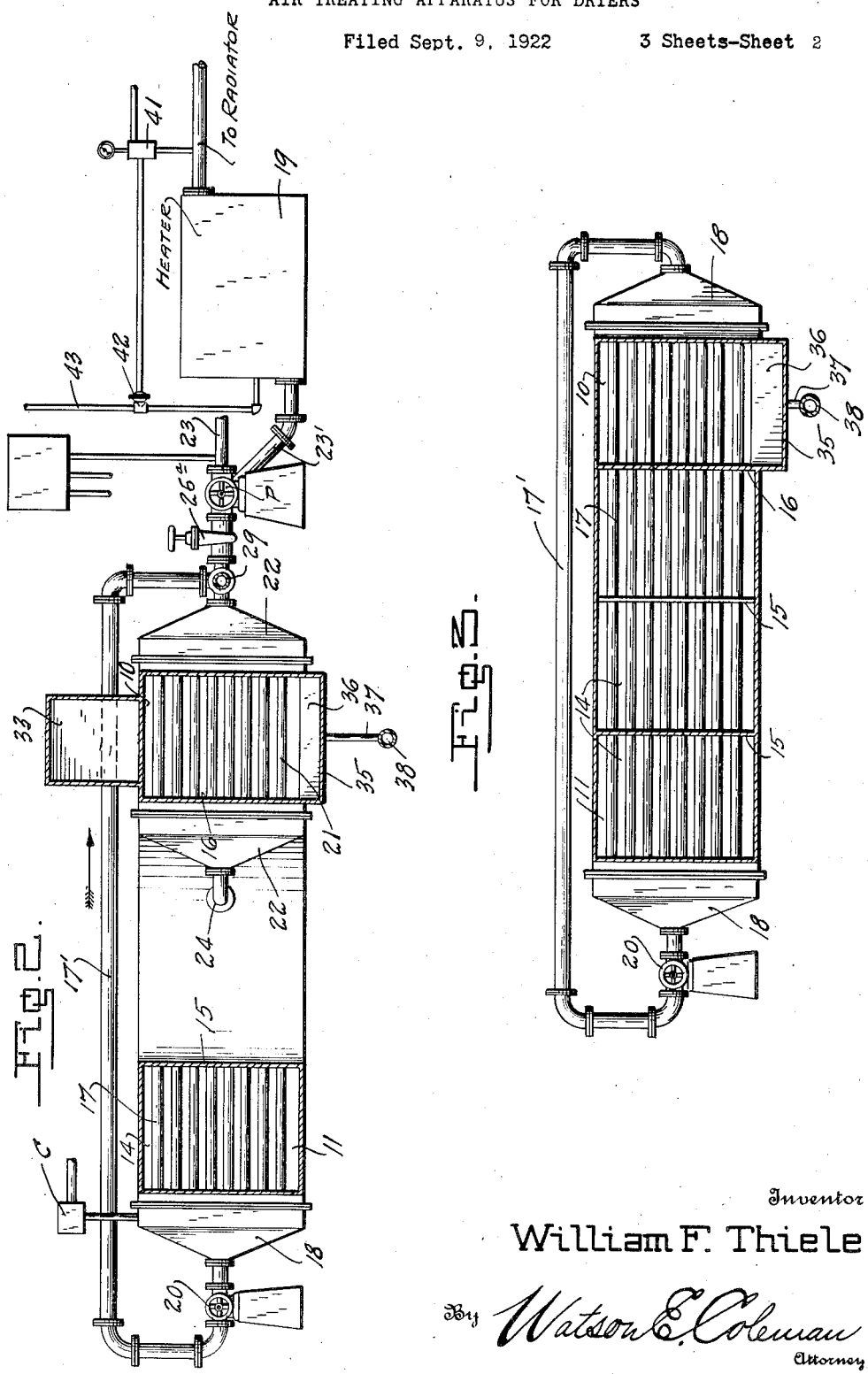

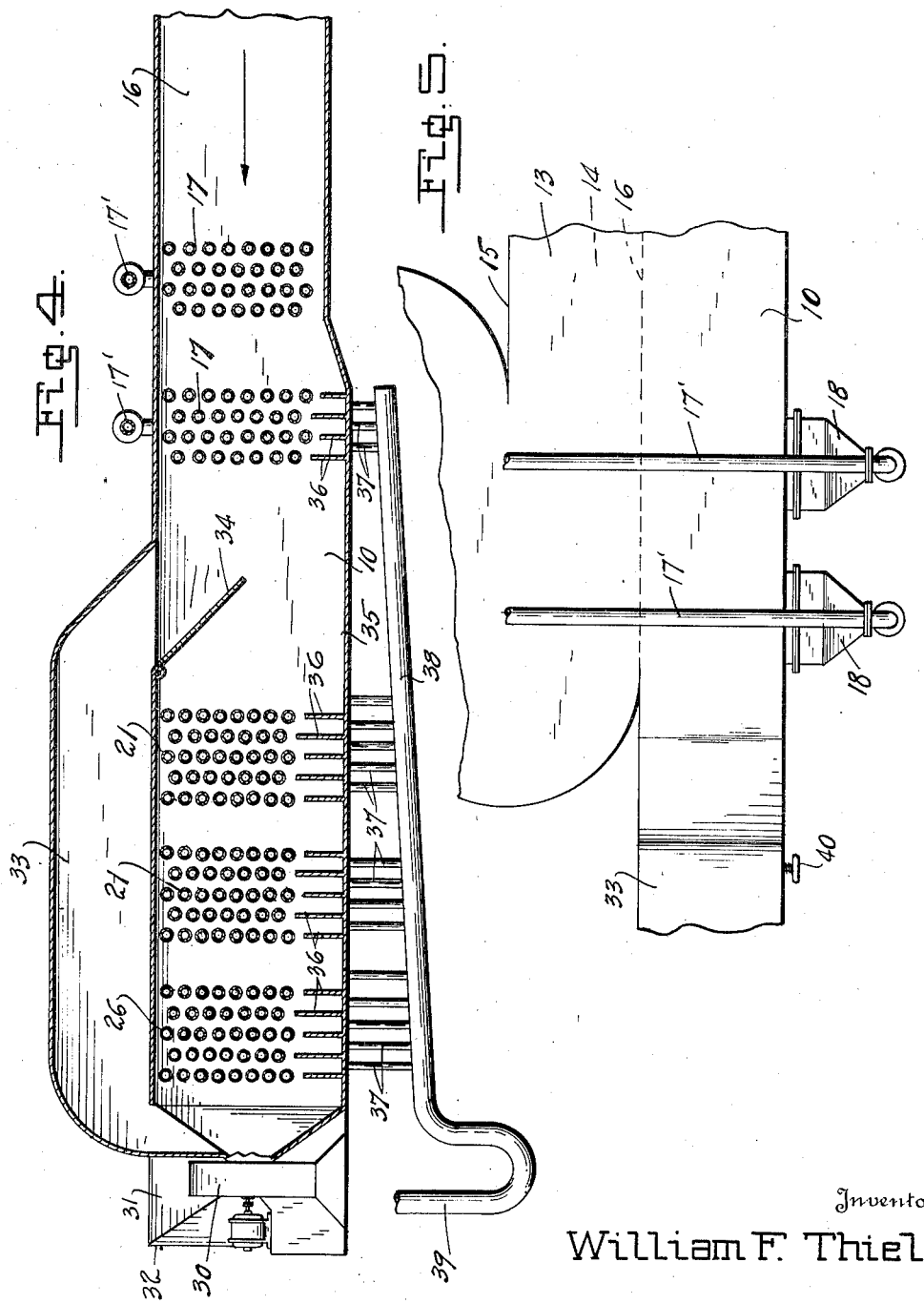

Patented Nov. 10, 1925.

1,560,950

UNITED STATES PATENT OFFICE.

WILLIAM FRED THIELE, OF WISCONSIN RAPIDS, WISCONSIN.

AIR-TREATING APPARATUS FOR DRIERS.

Application filed September 9, 1922. Serial No. 587,251.

*To all whom it may concern:*

Be it known that I, WILLIAM FRED THIELE, a citizen of the United States, residing at Wisconsin Rapids, in the county of Wood and State of Wisconsin, have invented certain new and useful Improvements in Air-Treating Apparatus for Driers, of which the following is a specification, reference being had to the accompanying drawings.

This invention relates to improvements in air treating apparatus for driers, and an important object of the invention is to provide means whereby the heat of the hot humid air withdrawn from a drier or drying room may be utilized for heating incoming air.

A further object of the invention is to provide means for insuring a continuous supply of dry heated air to the drier.

A still further object of the invention is to provide a simple and efficient apparatus for not only heating dry air for delivery to the drying room but for removing from the air drawn from the drying room the heat thereof together with the moisture and employing the heat for the heating of the air delivered to the drying room. It is well-known to those familiar with the art that in the ordinary drying room means are provided for heating articles in order that moisture contained therein may be driven off. To assist in this drying off of the moisture a continuous circulation of air is provided which is heated by the heaters of the drying room and which carries away with it the moisture given off by the articles being dried. Accordingly, an apparatus embodying means for employing the heat contained in the outgoing air from the drying room to assist in heating dry air entering the drying room will admit of a considerable saving in the loss of efficiency resulting from the heaters of the drying room having to raise the temperature of incoming air in order to maintain the proper temperature within the drying room.

Another object of the invention is to heat water or any other fluid with the heat remaining in the hot moist air after supplying all the necessary heat for heating the air being supplied to the drying room.

An additional object of the invention is to provide a device of this character which is simple in its construction and arrangement, efficient and durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a horizontal sectional view taken through an air treating apparatus constructed in accordance with my invention;

Figure 2 is a section on the line 2—2 of Figure 1;

Figure 3 is a section on the line 3—3 of Figure 1;

Figure 4 is a section on the line 4—4 of Figure 1; and

Figure 5 is a fragmentary plan view showing the manner of constructing the ducts.

Referring now more particularly to the drawings, the numeral 10 indicates a discharge conduit leading from a drying room (not herein shown) and the numeral 11 a feed conduit leading to the drying room. While a drying room is not herein illustrated it will be understood that such a drying room will embody means whereby articles contained within the room may be heated and accordingly air leaving the drying room will not only be heated but will contain moisture given off by the articles being dried in the drying room. The feed conduit 11 is plicated between its intake end 12 and the discharge end 13 to form a plurality of duct sections 14, adjacent duct sections having a common dividing wall 15. The discharge end 13 of the feed duct or conduit 11 lies against the discharge conduit 10 and at this point the feed and discharge conduits or ducts have a common wall 16. Series of tubes 17 extend through the discharge conduit and through the ducts 14, each series being provided at each end thereof with a header 18.

It will be noted that since the series of tubes 17 extend through the discharge duct 10, they will be engaged by the air passing therethrough and the water or any other fluid in them will receive therefrom a certain percentage of the latent heat of the moisture in the air. As the tubes continue through the ducts 14 which form a portion of the feed duct 11, this latent heat will be communicated to incoming air to the drier, thus heating this air, the air in the feed duct 11 passing to each of the tube series 17 three times in a structure similar to that at present illustrated, although this number may be enlarged if it is found desirable. The tube sections 17 are in the present instance disclosed as two in number but this number may be multiplied as is found necessary or desirable. The tube sections 17 are kept supplied with sufficient water to keep them filled at all times by means of a suitable supply control C of any desired construction.

The discharge end of the discharge conduit 10 has arranged therein a plurality of tube sections 21 extending transversely of the duct and each provided at each end thereof with a header 22. One of the headers 22 may be connected through pipe or a conduit 23 with plant heating system radiators (not herein shown) and the tube sections are connected in series by a conduit 24, the last tube section 21 being connected by a pipe 23' through a heater 19 with the feed pipe of the radiator system hereinbefore mentioned, the purpose of the heater 19 being to maintain the temperature of liquid passing through the circuit including the radiators at an even temperature at all times when the same is in operation. The pipe 23' has therein a valve 25ᵃ and a sewer outlet controlled by a pipe 25, for a purpose presently to appear. A further tube section 26 is arranged next adjacent the extremity of the discharge duct 10 and has its headers connected with a supply of cold water, as indicated at 27, and with the sewer, as indicated at 28.

The extreme discharge end of the discharge conduit 10 is connected by a blower 30 and duct 31 with the intake end of the feed duct 11 through a mechanical moisture eliminator indicated at 32 and which may be of any desired construction, the same being herein formally designated. Between the tube series 17 and the tube series 21 a by-pass duct 33 communicates with the discharge duct, the communication being controlled through medium of a damper 34. The discharge end of the by-pass duct communicates with the discharge end of the discharge duct 10 between the tube series 26 and the blower 30 so that when desired all or nearly all of the air passing through the discharge duct may be by-passed about the tube series 21 and 26. It will be obvious that the engagement of the hot humid air withdrawn from the drier by the discharge tube 10 coming into contact with the tube series 17, 21 and 26 will be cooled, thereby condensing the moisture in the air and affording a substantially dry supply, the drying of which is completed by the mechanical moisture eliminator hereinbefore referred to. In order that this condensation may not lie within the bottom of the duct or conduit 10 and serve to remoisten or humidify the air passing therethrough, I offset the bottom of the discharge conduit, as indicated at 35, this offset inclining downwardly toward the discharge end of the discharge conduit. Since it will be obvious that a large portion of the moisture will collect upon the pipes of the tube series and fall therefrom to the bottom of the duct 10, I provide baffle walls 36 extending upwardly from the offset portion 35 of the duct toward the lowermost tube of each bank of the tube series, these baffle walls dividing the bottom of the duct 10 into a plurality of sections each of which is connected by a discharge pipe 37 to a drain 38 having a water sealed outlet 39 from which the condensed water may be drawn by means of a pump or the like (not herein shown).

In the operation of my device, air heated and moisture laden in the drying room in passing from the drying room into the discharge duct impinges against the tubes of the tube sections 17 and the latent heat of this air and the moisture contained therein is partially transmitted to the water within these tubes. This water being continuously circulated in each of the tube sections 17 by means of its pump 20, passes through the plications of the return duct 11 and is cooled by the air, at the same time transmitting a portion of the heat carried thereby to the air returning to the drying room. After cooling, it is again returned to that part of the tubes passing through the discharge duct 10 by the pipes 17' and again passes through the tubes to repeat the operation. As the air passes through the discharge duct or comes into contact with the condenser coils 21, it transmits a further portion of its heat to the liquid in these tubes further condensing its moisture and precipitating the same to be drawn away by the sewer or discharge pipe 38. During winter months and at other times when the heat transmitted to the liquid within the tubes 21 may be conveniently employed for heating some form of radiators or the like, the valve 25ᵃ will be opened and the valve 29ᵃ in the pipe 29 closed and the pump P in the return pipe 23 employed to force the liquid through the tubes and through the radiation system which, as hereinbefore described includes the heater 19 for maintaining the temperature at a given constant. At times when no use is had for the heated water from these tubes, the valves 29ᵃ and 25 are opened and the valves 25ᵃ and 26ᵃ closed so that water is taken from the feed pipe 27 and passed through the condenser coils 21 and discharged to the sewer. The condenser coil 26 when in use is fed from the pipe 27 and discharges direct to the sewer. The series 26 being provided with a supply of cold water will still further condense the moisture in the air passing through the duct 10, leaving the same substantially dry so that the drying operation may be readily completed by the mechanical moisture eliminator before the entrance of the air to the feed duct 11. The by-pass duct 33 serves the function of preventing the abnormal cooling of the air when no drying is being done and circulation of the air is necessary. The damper 34 may be operated by any suitable means, such as a handle 40 disposed exteriorly of the duct. In the present instance I have merely illustrated an open tank heater 19 as a means for adding additional heat to water for use in plant other than drying rooms. The tank 19 will, of course, be provided with some suitable means for controlling the temperature of the water employed in the radiating system. In the present instance this means consists in a thermostat 41 controlling the operation of a steam valve 42 admitting steam through a conduit 43 to heat the water. It will be obvious that this showing is merely diagrammatic, since any suitable means whereby the temperature may be closely regulated and embodying any kind of desired heating system may be employed.

From the foregoing it is believed to be obvious that a heating system for driers constructed in accordance with my invention will provide a continuous supply of hot dry air to the drier and will be economical in its operation in view of the fact that it employs the latent heat of the moisture in the air drawn from the drier for initially heating the water subsequently employed for heating air fed to the drier. It will furthermore be obvious that the construction hereinbefore set forth is capable of many changes and modifications without materially departing from the spirit of my invention and I accordingly do not limit myself thereto except as hereinafter claimed.

I claim:—

1. An air drying system for driers comprising a feed duct, a separate discharge duct, and heat transfer means thermally related to the said ducts for receiving heat from the air in the discharge duct and communicating this heat to air in the feed duct.

2. An air drying system for driers comprising a feed duct, a discharge duct, and heat transfer means extending into the discharge duct and thermally related to the feed duct for receiving heat from the air in the discharge duct and communicating this heat to the air in the feed duct.

3. An air drying system for driers embodying a feed duct and a discharge duct, and means extending into both of said ducts receiving heat from air drawn through the discharge duct and communicating this heat to air passing through the feed duct.

4. An air drying system for driers, comprising a plicated feed duct, a discharge duct, and heat transfer means extending through the plications of the feed duct and through the discharge duct for receiving heat from the air in the discharge duct and communicating this heat to air in the feed duct.

5. An air drying system for driers embodying a feed duct and a discharge duct, means extending into both of said ducts receiving heat from air drawn through the discharge duct and communicating this heat to air passing through the feed duct, and means in the discharge duct for condensing moisture in the air passage therethrough.

6. An air drying system for driers comprising a feed duct, a discharge duct, means for withdrawing air through the discharge duct and forcing the same through the feed duct, means for eliminating moisture from the air from the discharge duct, and heat transfer means thermally related to the said ducts for receiving heat from the air in the discharge duct and communicating this heat to air in the feed duct.

7. An air drying system for driers embodying a feed duct and a discharge duct, means extending into both of said ducts receiving heat from air drawn through the discharge duct and communicating this heat to air passing through the feed duct, means in the discharge duct for condensing moisture in the air passing therethrough, and a connection between the discharge end of the discharge duct and the inlet end of the feed duct including a mechanical moisture eliminator.

8. In an air drying system for driers, a feed duct, a discharge duct, means within the feed duct for heating air passing therethrough, and means within the discharge duct for applying a step by step cooling thereto.

9. In an air drying system for driers, a feed duct, a discharge duct, means within the feed duct for heating air passing therethrough, means within the discharge duct for applying a step by step cooling thereto, means for withdrawing condensed water from the discharge duct, and a connection between the discharge end of the discharge duct and the inlet end of the feed duct including a mechanical moisture eliminator.

10. In an air treating mechanism for driers including a feed duct, a discharge duct, heating coils within the feed duct, and means for circulating and heating liquid for said heating coils including condenser coils arranged within the discharge duct and receiving heat from the air passing therethrough.

11. In air treating means for driers, a feed duct, a discharge duct, the feed duct being plicated, tube sections extending through the plications of the feed duct, and means for supplying heated fluid to said tubes including other tube sections extending through the discharge duct and receiving heat therefrom, the ends of the first named tube sections likewise extending through said discharge duct.

12. In air treating means for driers, a feed duct, a discharge duct, a connection between the ducts including a mechanical moisture eliminator and a blower, condenser coils extending through the discharge and feed ducts, and means for circulating water through said coils.

13. In air treating means for driers, a feed duct, a discharge duct, a connection between the ducts including a mechanical moisture eliminator and a blower, condenser coils extending through the discharge and feed ducts, means for circulating liquid through said coils, other condenser coils in said discharge duct, and means for by-passing air in the discharge duct around the last named condenser coils.

14. In air treating means for air driers, a feed duct, a discharge duct, a connection between the ducts including a moisture eliminator and a blower, a plurality of condenser coils arranged within the discharge duct, baffle plates extending upwardly from the bottom of the discharge duct toward said condenser coils and dividing the base of the discharge duct into a plurality of passages, a drain pipe, and a connection between each of said brackets and said drain pipe.

15. A method of treating air for air driers to permit continuous circulation thereof consisting in employing the humid air drawn from the drier to heat the fluid whereby the moisture in the air is condensed, completing the elimination of the moisture from the humid air, returning the same to the drier and heating the air during its return to the drier by said fluid.

In testimony whereof I hereunto affix my signature.

WILLIAM F. THIELE.